United States Patent
Brown et al.

(10) Patent No.: US 7,047,517 B1
(45) Date of Patent: May 16, 2006

(54) SYSTEM FOR INTEGRATING DATA BETWEEN A PLURALITY OF SOFTWARE APPLICATIONS IN A FACTORY ENVIRONMENT

(75) Inventors: Russell C. Brown, Austin, TX (US); Donald C. Likes, Austin, TX (US); David A. Richardson, Austin, TX (US); William A. Norris, Laramie, WY (US); Yurong Shi, Austin, TX (US); Jeffrey B. Toth, Austin, TX (US); Barry R. Hobbs, Austin, TX (US)

(73) Assignee: Advanced Micro Devices, Sunnyvale, CA (US)

( * ) Notice: Subject to any disclaimer, the term of this patent is extended or adjusted under 35 U.S.C. 154(b) by 726 days.

(21) Appl. No.: 09/898,876

(22) Filed: Jul. 3, 2001

(51) Int. Cl.
*G06F 9/44* (2006.01)
(52) U.S. Cl. .................. 717/108; 717/116; 700/121
(58) Field of Classification Search ............... 717/116, 717/108, 120–121, 136–140; 718/106; 719/310, 719/315, 319, 328; 700/96, 121
See application file for complete search history.

(56) References Cited

U.S. PATENT DOCUMENTS

| | | | | |
|---|---|---|---|---|
| 5,797,006 A | * | 8/1998 | Sitbon et al. | 719/320 |
| 5,860,005 A | * | 1/1999 | Inoue | 717/101 |
| 5,937,189 A | * | 8/1999 | Branson et al. | 717/101 |
| 6,289,500 B1 | * | 9/2001 | Baxter et al. | 717/108 |
| 6,308,178 B1 | * | 10/2001 | Chang et al. | 707/100 |
| 2003/0163597 A1 | * | 8/2003 | Hellman et al. | 709/316 |

* cited by examiner

*Primary Examiner*—Antony Nguyen-Ba
(74) *Attorney, Agent, or Firm*—Hamilton & Terrile, LLP; Stephen A. Terrile

(57) ABSTRACT

An architecture for integrating data between a plurality of software applications in a factory environment comprises a factory system and a domain application. The factory system comprises a domain object superclass and at least two first-level subclasses of the domain object superclass. An instantiation of one of the first-level subclasses corresponds to a domain object, which represents an item in a factory. The factory system also includes a service, which provides an operation related to the domain object. The service comprises at least one component, where each component is operable to perform the operation related to the domain object. The architecture also includes a domain application, which implements a component of the service of the factory system to perform the operation related to the domain object. The architecture can optionally include a system manager for managing hardware and software in the factory.

25 Claims, 6 Drawing Sheets

SYSTEM FOR INTEGRATING DATA BETWEEN A PLURALITY OF SOFTWARE APPLICATIONS IN A FACTORY ENVIRONMENT

BACKGROUND OF THE INVENTION

1. Field of the Invention

The present invention relates generally to factory systems and, more particularly, to an architecture for an extensible factory system.

2. Description of the Related Art

Technological advances have produced increasingly complex manufacturing systems, and accordingly, increasingly complex computer systems are necessary to manage the manufacturing process in a factory or other manufacturing environment. Information must be gathered to determine output requirements, to procure raw materials, to allocate manufacturing resources, to schedule work in various manufacturing processes, to track work in progress, to troubleshoot and correct manufacturing problems, to measure actual manufacturing performance, to compare actual performance to performance goals, and to control quality of units produced. The sources of information used to make these management decisions vary widely, from product sales data to shop personnel to the actual manufacturing tools themselves. Many manufacturing facilities manage this vast information by combining multiple computerized management systems with paper-based management systems.

Problems with capturing and communicating information are exacerbated in a semiconductor factory. Manufacturing of integrated circuits is perhaps the most complex manufacturing process in existence today. Factors contributing to this complexity include constant device miniaturization, process intricacy, product diversity, and changing technologies. Management of the semiconductor manufacturing process is accordingly complex and can involve planning thousands of steps to be performed on a silicon wafer to produce a fully packaged and integrated electronic component.

These thousands of steps are performed by many different types of tools in the factory, and most tools communicate information in a vendor-specific way. Although communication standards such as SECS-I and SECS-II (managed by Semiconductor Equipment and Materials International (SEMI)) have been adopted, these standards define only syntax and not content. Each vendor determines the content of the data provided by its tools and has little incentive to develop or follow a standard used by other vendors.

As a result, data about the manufacturing process in the factory are sometimes available as a live data stream from a tool in the factory, with content and format varying for each tool according to the vendor supplying the tool. Data about the manufacturing process are also available from domain applications, which collect data from tools and analyze the data.

In most factories it is desirable to have a single system that controls product flow and equipment usage. Such a system is referred to herein as a factory system. A factory system must overcome the complexities of communicating with tools that provide different types of data in varying formats. In most factories, the factory system interacts with numerous domain applications such as a manufacturing execution system, equipment interfaces, user authentication systems, statistical process control applications, engineering data analysis systems, equipment performance reporting applications, and material handling systems.

However, a single product or a suite of products from a single vendor seldom meets the software needs of any particular factory. Typically, domain applications from which the factory system obtains information are provided by many different information technology organizations and many different third-party vendors. The domain applications are furthermore designed to serve very specific purposes, are developed using software and operating systems selected by the respective vendors, are distributed across various hardware and/or networks in the factory, and are typically not designed to interact with or provide information to other domain applications. As a result, information needed for efficient operation of the factory is scattered among different domain applications in different locations with incompatible technologies and incompatible data storage mechanisms.

Furthermore, each of the domain applications likely has its own nomenclature for items in the factory and therefore does not "speak the same language" as the other domain applications. The term item is used herein to describe physical objects in the factory as well as logical concepts such as lots, routes, processes, and recipes. Data about an item can be organized in different ways by different domain applications. For example, some domain applications in a semiconductor factory can identify a wafer by a slot and a carrier, whereas other domain applications refer to the wafer's vendor scribe.

Finally, the architecture of most factory systems requires that, when new capabilities are to be added, the new capabilities must be integrated to each of the domain applications in the factory system. Each of these integration points is usually quite expensive and time-consuming to implement, and each new domain application increases the factory system's complexity. In addition, every domain application is usually dependent on the particular systems and implementation technologies with which it communicates. As a result, replacing a domain application is difficult because everything that communicates with it must be changed.

What is needed is an architecture for a factory system that overcomes the fact that domain applications are distributed and have inconsistent interfaces and incompatible technologies. The architecture should decrease the complexity of integrating information obtained from a large number of different domain applications residing in different locations and provided by different vendors. The architecture should allow a domain application to be easily modified or replaced without affecting other domain applications. Finally, the architecture should provide a common nomenclature for items in the factory and a common interface between domain applications.

SUMMARY OF THE INVENTION

The present invention provides an architecture for integrating data between multiple software applications in a factory environment. The architecture includes a factory system having a domain object framework for domain objects representing items in a factory such as physical objects and logical concepts. The factory system also includes a service providing components that perform operations on the domain objects. The architecture also includes a domain application that provides an implementation of at least one component of the service. The architecture can optionally include a system manager for managing hardware and software in the factory.

The architecture enables the factory system to overcome the fact that domain applications are distributed and have inconsistent interfaces and incompatible technologies. The architecture decreases the complexity of integrating information obtained from a large number of different domain applications residing in different locations and provided by different vendors. The architecture also allows a domain application to be easily modified or replaced without affecting other domain applications. Finally, the architecture provides a common nomenclature for physical objects and logical concepts and a common interface between domain applications.

In one aspect of the invention, an architecture for integrating data between a plurality of software applications in a factory environment comprises a factory system and a domain application. The factory system comprises a domain object superclass and at least two first-level subclasses of the domain object superclass. An instantiation of one of the first-level subclasses corresponds to a domain object, which represents an item in a factory. The factory system also includes a service, which provides an operation related to the domain object. The service comprises at least one component, where each of the at least one component is operable to perform the operation related to the domain object. The architecture also includes a domain application, which implements a component of the service of the factory system to perform the operation related to the domain object.

In another aspect of the invention, a factory system for integrating data between a plurality of software applications in a factory environment is provided. The factory system comprises a domain object superclass and at least two first-level subclasses of the domain object superclass. An instantiation of one of the first-level subclasses corresponds to a domain object, which represents an item in a factory. The factory system also includes a service, which provides an operation related to the domain object. The service comprises at least one component, where each of the at least one component is operable to perform the operation related to the domain object. The factory system interacts with a domain application, which implements a component of the service of the factory system to perform the operation related to the domain object.

In an additional aspect of the invention, a domain application implements a component to perform an operation related to a domain object. The domain application interacts with a factory system to integrate data between a plurality of software applications in a factory environment.

In another aspect of the invention, a method for integrating data between multiple software applications in a factory environment is provided. The method includes providing a domain object superclass in a first software application, where the first software application corresponds to a factory system. The method further includes providing at least two first-level subclasses of the domain object superclass. The method further includes instantiating one subclass of the first-level subclasses to create a domain object, the domain object representing an item in a factory. In addition, the method includes providing a service that provides an operation related to the domain object, where the service comprises at least one component. Each of the at least one component is operable to perform the operation. The method also includes performing the operation related to the domain object using an implementation of one component of the service, where the implementation is provided by a second software application. The second software application corresponds to a domain application.

In yet another aspect of the invention, a computer program product is provided. The computer program product includes instructions for providing a domain object superclass in a first software application, where the first software application corresponds to a factory system. The computer program product also includes instructions for providing a plurality of first-level subclasses of the domain object superclass and instructions for instantiating one subclass of the first-level subclasses to create a domain object. The domain object represents an item in a factory. The computer program product further includes instructions for providing a service that provides an operation related to the domain object. The service comprises at least one component, where each component is operable to perform the operation. The computer program product also includes instructions for performing the operation related to the domain object using an implementation of one component of the at least one component of the service. The implementation is provided by a second software application, where the second software application corresponds to a domain application. The computer program product also includes a computer-readable medium for storing the instructions for providing the domain object superclass, the instructions for providing the plurality of first-level subclasses, the instructions for instantiating, the instructions for providing the service, and the instructions for performing the operation.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

Figure 1:
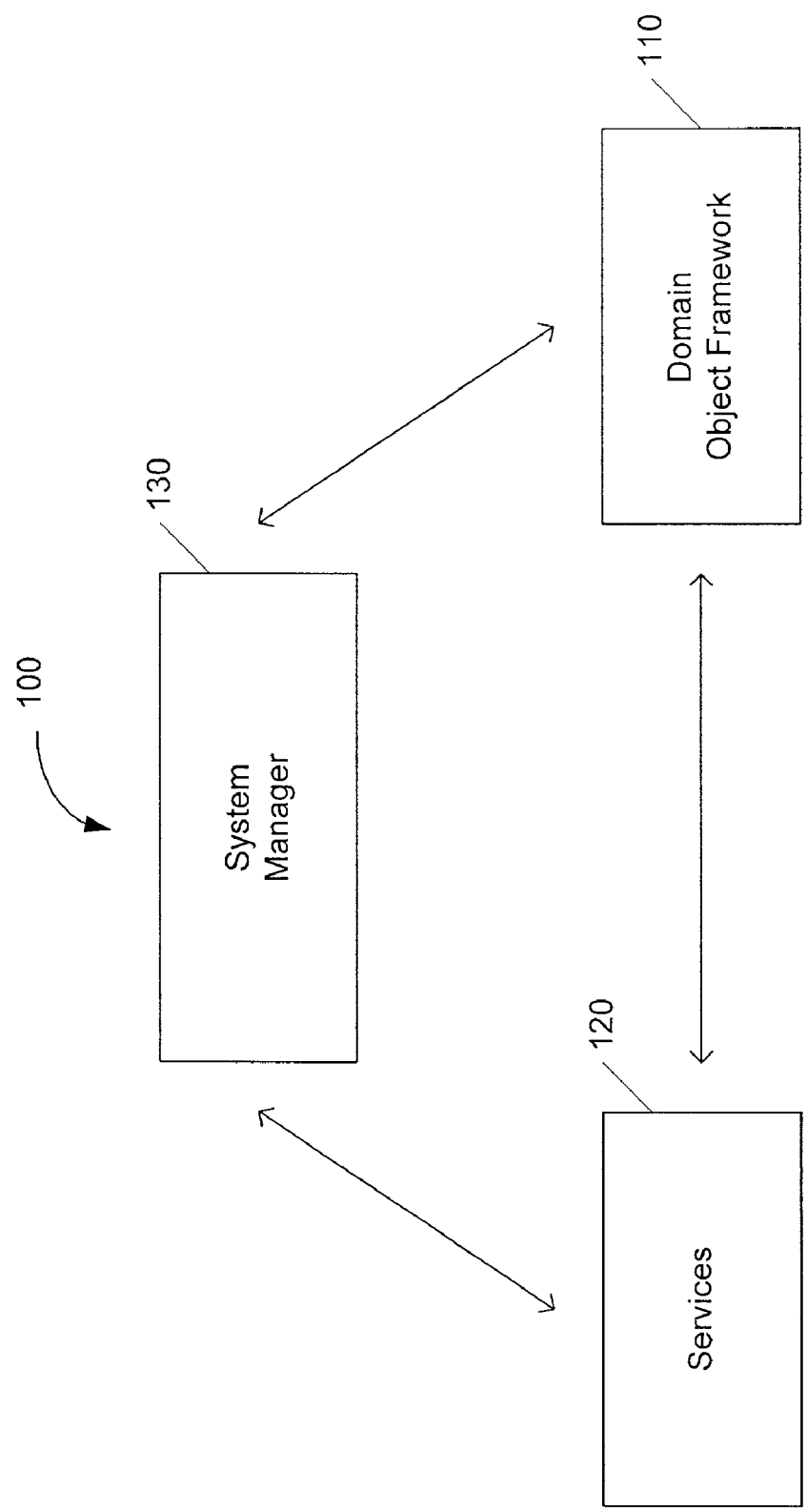
FIG. 1 is a block diagram showing elements of a factory system architecture.

The following is intended to provide a detailed description of an example of the invention and should not be taken to be limiting of the invention itself. Rather, any number of variations may fall within the scope of the invention which is defined in the claims following the description.

The present invention provides an architecture for integrating data between multiple software applications in a factory environment. The architecture is an object-oriented component architecture. The architecture includes a factory system having a domain object framework for domain objects representing items in the factory. The factory system also includes services comprising at least one component providing operations on the domain objects. The architecture further includes a domain application, which implements a component of the service.

The architecture can optionally include a system manager for managing hardware and software in the factory. The hardware and software in the factory host distributed components of the factory system. Objects representing hardware and software in the factory are referred to as system objects.

For those unfamiliar with object-oriented programming, a brief summary is presented here. The building block of object-oriented programming is the object. An object is defined through its state and behavior. The state of an object is set forth via attributes of the object, which are included as data fields in the object. The behavior of the object is set forth by methods of the object.

Each object is an instance of a class, which provides a template for the object. A class defines zero or more data fields to store attributes of an object and zero or more methods. Attributes stored in the data fields of the object can be interpreted only using the methods specified by the object's class.

Each data field contains attribute information defining a portion of the state of an object. Objects that are instances of the same class have the same data fields, but the particular attribute values contained within the data fields can vary from object to object. Each data field can contain information that is direct, such as an integer value, or indirect, such as a reference or pointer to another object.

A method is a collection of computer instructions that execute in a processor. The methods for a particular object define the behavior of the object. The instructions of a method are executed when the method is invoked by another object or by an application program. The object performing the method is the responder, also called a responding object.

To perform the method, the name of the method is identified in the object's class to determine how to define that operation on the given object. When performing the method, the responder consumes zero or more arguments, i.e., input data, and produces zero or one result, i.e., an object returned as output data.

A class has a position in a "class hierarchy." Methods or code in one class can be passed down the hierarchy to a subclass or inherited from a superclass, a concept called "inheritance." When a method of an object is called, the method that is used can be defined in a class of which the object is a member or in any one of superclasses of the class of which the object is a member.

In a object-oriented component architecture such as that of the present invention, components either provide building blocks of programming code, call a service to perform business logic using programming code, or provide an interface to other systems that provide programming code. An interface component can be considered to be a common interface to programming code for use by multiple application programs.

The programming code for a component can be run by a container, which is an application program or subsystem. The container can be said to host the component and can be referred to as a hosting system object. In at least one embodiment of the present invention, a component communicates with other parts of the factory system via its container, enabling the component to communicate independently of the structure of the other parts of the factory system.

The architecture of the present invention enables the factory system to overcome the fact that domain applications are distributed and have inconsistent interfaces and incompatible technologies. The architecture decreases the complexity of integrating information obtained from a large number of different domain applications residing in different locations and provided by different vendors. The architecture also allows a domain application to be easily modified or replaced without affecting other domain applications. Finally, the architecture provides a common nomenclature for physical objects and logical concepts and a common interface between domain applications.

FIG. 1 shows elements of a factory system 100. The elements shown include a domain object framework 110, services 120 and a system manager 130. System manager 130 can optionally be included in factory system 100. Other elements also can be included in the factory system 100 architecture.

Domain object framework 110 provides a set of object-oriented programming (OOP) classes. Each class embodies a predetermined set of attributes and methods for providing a common group of behaviors for objects that are instantiations of the class. An application program developer uses a framework such as domain object framework 110 and builds upon it, adding subclasses and attributes and modifying methods depending on the problem to be solved. Such changes to a framework, typically referred to as framework extensions, are made possible by the OOP concepts of inheritance and polymorphism.

Domain object framework 110 allows domain applications to continue to operate independently, yet takes advantage of the data and functionality those domain applications provide. Domain object framework 110 is easily extensible, allowing new domain applications to be added and existing domain applications to be changed without affecting other domain applications in the factory.

Services 120 provides a common service interface to the different domain applications comprising the factory system for operations to be performed on domain objects. An operation is performed on a domain object by programming code implementing business logic. Business logic can be implemented in the form of one or more business rules. For example, the operation of storing data provided by a tool requires business logic indicating where the data are to be stored.

An operation is fulfilled by one or more components, each of which is capable of performing the operation. A component or a collection of components that can perform a particular operation or group of related operations is called a service. The component to be used to perform the operation is determined by the service. Services 120 includes at least one service.

Figure 2:
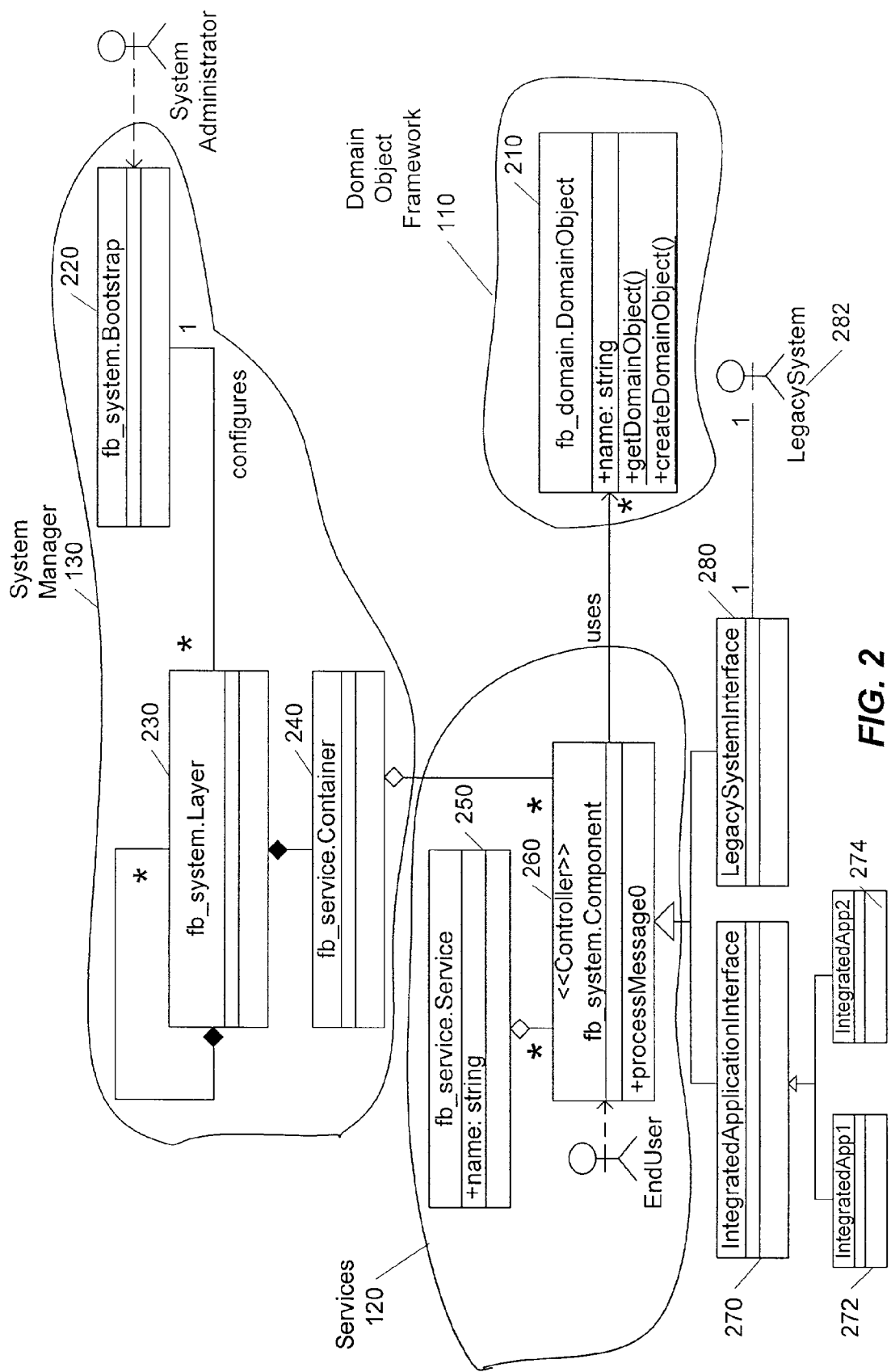
FIG. 2 is a class diagram showing objects within each of the elements of FIG. 1 and the interactions between the objects.

FIG. 2 shows an embodiment of the classes within each of the elements of the factory system of FIG. 1 and interactions between the objects of the different classes. In the description of the Figures, the notation XXXi is used to indicate an object which is an instantiation of the class XXX, where XXX corresponds to the reference symbol used for the class in the Figures.

Domain object framework 110 includes a domain object superclass 210, an abstract class including only a name attribute. Domain object superclass 210 delegates all operations on domain objects to methods of subclasses. Domain object superclass 210 includes two methods, getDomainObject( ) and createDomainObject( ). In the architecture of the present invention, no implementation of domain object methods is included in domain object superclass 210. Rather, the code implementing a method of a domain object resides in a domain application.

Because domain object superclass 210 is an abstract class, domain objects are not an instantiation of the domain object superclass 210. Rather, subclasses (not shown) of domain object superclass 210 are provided in domain object framework 110 and domain objects are instantiations of these subclasses. These subclasses can represent different types of domain objects.

Figure 3:
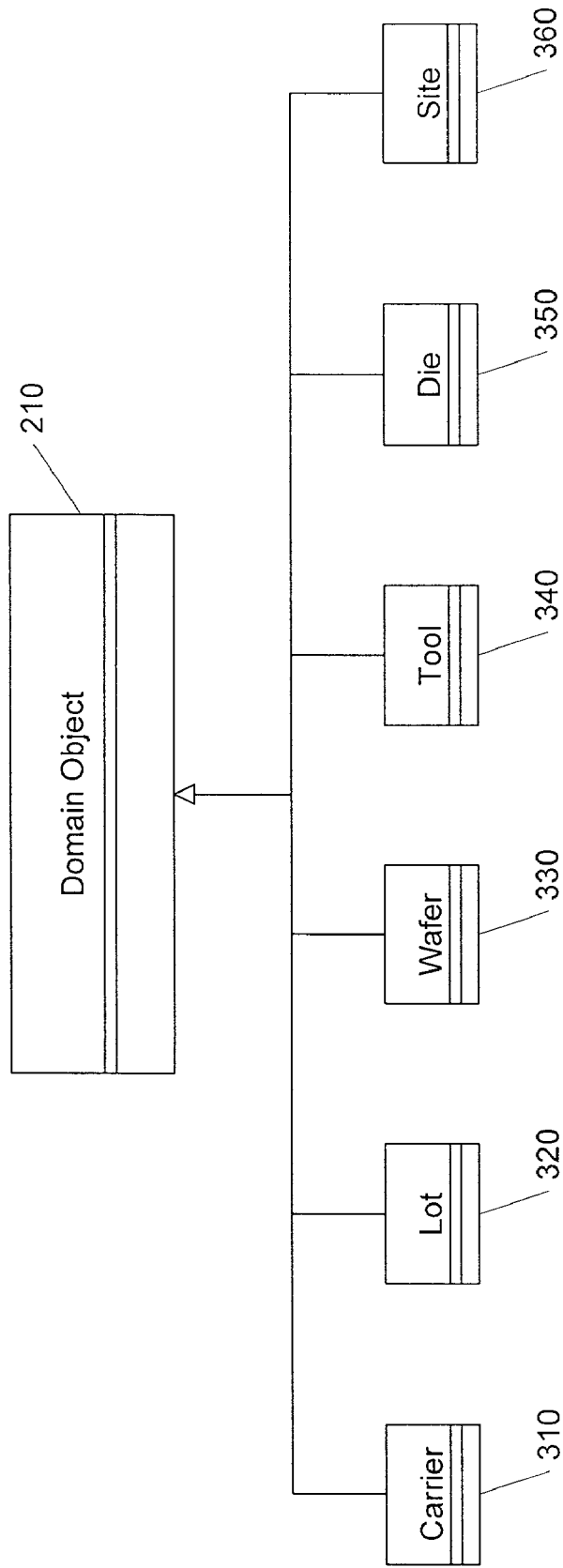
FIG. 3 is a block diagram showing classes of domain objects of the domain object framework of FIG. 2 according to one embodiment of the invention.

FIG. 3 provides examples of subclasses of domain object superclass 210 for a semiconductor factory domain. In a semiconductor factory, the domain includes items, such as a carrier, a lot, a wafer, a tool, a die, a site, and so on. The term item as used herein includes physical objects and/or logical concepts such as a lot or a recipe. Corresponding subclasses therefore include a carrier subclass 310, a lot subclass 320, a wafer subclass 330, a tool subclass 340, a die subclass 350, and a site subclass 360. Instantiations of these subclasses include a carrier object, a lot object, a wafer object, a tool object, a die object, and a site object. For the convenience of the reader, the term domain object 210$i$ is used to refer to an instantiation of any one of the subclasses of domain object 210. In the embodiment shown in FIG. 3, the term domain object 210$i$ is used to describe any one of the objects carrier 310$i$, lot 320$i$, wafer 330$i$, tool 340$i$, die 350$i$, and site 360$i$.

Factory system architecture 100 is designed such that each domain object 210$i$ can provide any information pertaining to the item that is available in the various domain applications comprising the factory system. For example, a wafer object can determine what cassette the wafer is in using information tracked by a material handling domain application. The wafer object can also store engineering data from the tool that is processing the wafer by calling an engineering data domain application. The wafer object also has methods that domain applications can call to perform operations on the wafer. Services 120 enable a domain object to provide this information, as described below.

Returning to FIG. 2, services 120 includes a service class 250 and a component class 260. A service 250$i$ provides at least one operation or a group of related operations that can be performed on a domain object 210$i$. A request to perform an operation is made by calling the service 250$i$ to perform the operation. A service 250$i$ is related to at least one component 260$i$, each component 260$i$ providing business logic capable of performing the operation.

A component 260$i$ provides programming code to implement business logic for performing operations on at least one domain object 210$i$. A component can include programming code for the business logic, code that sends a message to a service to perform the business logic, or an interface to a domain application including the business logic. Some operations are implemented as a part of the component 260$i$ itself, such as in a case where the business logic involves a sequence of operations on a domain object 210$i$. Other operations are implemented as a method of a domain object 210$i$, where code residing in a domain application provides the implementation of the business logic for the method. In such a case, the component includes an interface to the domain application. The integration of domain applications to provide methods for the domain object superclass 210 enables a domain object 210$i$ to provide information about itself from any domain application.

The Process Message method of component superclass 260 accepts messages from callers in the form of a message object as a parameter. The message object provides the class and method which it is calling, and optionally provides other information specific to the method. Component 260$i$ uses the information provided in the message object and makes the call to the method.

If business logic is changed, only the domain application implementing the functionality of the method must be changed. Other domain applications inherit the functionality as a child of the domain object superclass 210 and invoke the functionality of the method by a call to the implementing domain application.

Any one of the components 260$i$ comprising a service 250$i$ can be selected by the service 250$i$ to perform an operation.

The term "domain application" is used herein to describe different types of applications, such as an integrated application or a legacy system, with which the factory system interacts. An integrated application is integrated with the factory system to provide part of the implementing code for methods of at least one domain object 210$i$ of the domain object framework 110. Domain object superclass 210 delegates an operation to a method of a subclass, where the integrated application provides the implementing code for the operation on objects that are members of the subclass. Each integrated application to which a component 260$i$ provides an interface is also capable of implementing the subclasses of domain object superclass 210 to implement the functionality of the domain object 210$i$ that the integrated application understands. Code from the integrated application is used to perform the operation without the need to revise the calling domain application to use the integrated application.

Another type of domain application is a legacy system, which is an application that is not integrated to provide methods for domain objects. A legacy system is an application that the factory system requests to perform an activity. Examples of activities are to perform some physical operation in the factory, such as putting a lot on hold, or requesting information from a database that is returned to the factory system. The component that implements the legacy application's interface calls the legacy system to perform the activity. The factory system can then use information received from the legacy system to perform operations on domain objects.

An example of the operation of a legacy system is a legacy recipe manager. A recipe is a set of instructions for a machine to do a particular task, and a recipe manager stores and keeps track of recipes. A machine domain object in the extensible factory system has a method getRecipe. The recipe is not an attribute of the machine itself because only the legacy recipe manger knows about the machine's recipe. The getRecipe method contains programming code similar to the following: sendMessage ("recipemanager," "getRecipe"). In this example, "recipemanager" is a service that contains components of type RecipeManagerInterface (which is a subclass of component class 260). A RecipeManagerInterface component receives the message, makes a call to the legacy recipe manager through techniques peculiar to the legacy recipe manager, and passes the return value back to the machine domain object.

In FIG. 2, domain application 272 and domain application 274 are examples of integrated applications. Legacy system 282 is an example of a legacy system. By allowing a component to be an interface to another application, the present invention enables a domain application to provide functionality for the factory system without the need to modify other domain applications that also need that functionality.

A service optionally can have a modality, which describes a relationship between components implementing the same operation. A modality is a behavior used in selecting a component 260i to perform the operation requested from the service. Examples of modalities include binary fail-over behavior, balance load behavior, pool behavior, and spawn behavior.

Binary fail-over behavior describes a situation where a component is identified as the primary component for selection from the components of a service 250i. Another component implementing the same operation is identified as a backup component. If the primary component fails, the backup component is selected to perform the operation instead.

Balance load behavior describes a situation where components are selected so that operations are split evenly between the components comprising a service. Spawn behavior describes a situation where a component is created to service each request for an operation. Pool behavior is similar to spawn behavior, except that only a limited number of components is created. If the limit is reached, subsequent requests for operations must wait until an existing component is freed.

Figure 4:
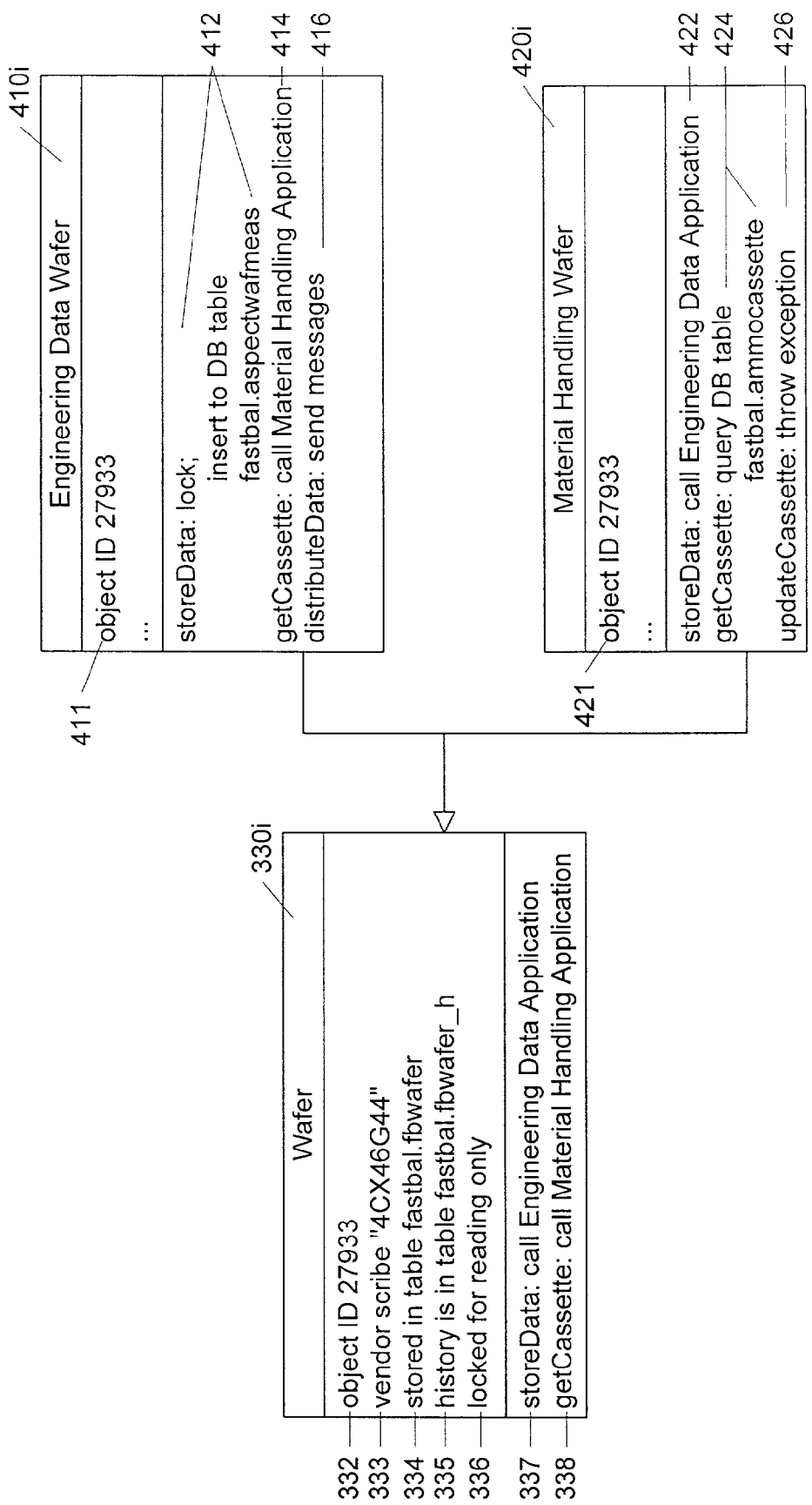
FIG. 4 shows a domain object superclass for a wafer in a semiconductor manufacturing environment and subclasses of the wafer superclass.

FIG. 4 illustrates a wafer object 330i that is an instantiation of a domain object superclass for a wafer, wafer superclass 330 of FIG. 3. Also shown are wafer object 410i, an instantiation of a second-level subclass engineering data wafer subclass 410 (not shown), and wafer object 420i, an instantiation of a second-level material handling wafer subclass 420 (not shown). These second-level subclasses are implemented by two integrated applications, an engineering data domain application and a material handling domain application, and provide implementations of methods for wafer superclass 330. According to wafer superclass 330, wafer object 330i includes attributes objectID 332, vendor scribe 333, stored 334, history 335, and lock 336.

A wafer object also includes two methods, storeData method 337 and getCassette method 338. StoreData method 337 is implemented via a call to the engineering data domain application, and getCassette method 338 is implemented by a call to the material handling domain application.

Engineering data wafer 410i inherits the objectID 411 with a value of 27933 from its parent wafer 330i objectID 332. Engineering data wafer subclass 410 implements the storeData method 337 for wafer superclass 330 as shown for storeData method implementation 412. Engineering data wafer subclass 410 does not provide code for getCassette method 338, instead calling the material handling application to get a cassette. GetCassette method implementation 414 is shown for illustration purposes only; engineering data wafer subclass 410 inherits the getCassette method from the wafer superclass 330. Engineering data wafer subclass 410 also includes its own distributeData method 416, which is private to the engineering data wafer subclass 410 and not visible to wafer superclass 330.

Material handling wafer 420i inherits the objectID 421 with a value of 27933 from its parent wafer 330i. Material handling wafer subclass 420 implements the getCassette method 338 as shown in getCassette method implementation 424. Material handling wafer subclass 420 does not provide code for storeData method 338. StoreData method implementation 422 is shown for illustration purposes to point out that material handling wafer subclass 420 inherits the storeData method from wafer superclass 330. Wafer superclass 330 calls the engineering data application to implement storeData method 338. Material handling wafer class 420 also has its own private method updateCassette method 426 that is not visible to wafer superclass 330.

If a third domain application needs to know the cassette in which the wafer with an objectID value of 27933 currently resides, the third domain application queries parent wafer 330i providing the objectID of 27933. Parent wafer 330i calls the material handling application's getCassette method 424 of material handling wafer 420i with objectID 27933. The method produces a result indicating the cassette in which the wafer with objectID 27933 resides, and parent wafer 330i provides the result to the third domain application. The third domain application does not need to know which application is responsible for determining which cassette a wafer is in, nor does it need to know how to call the material handling application. The material handling application's implementation of the getCassette method can completely change, and no changes are necessary for the third domain application to obtain information from the material handling application.

Figure 5:
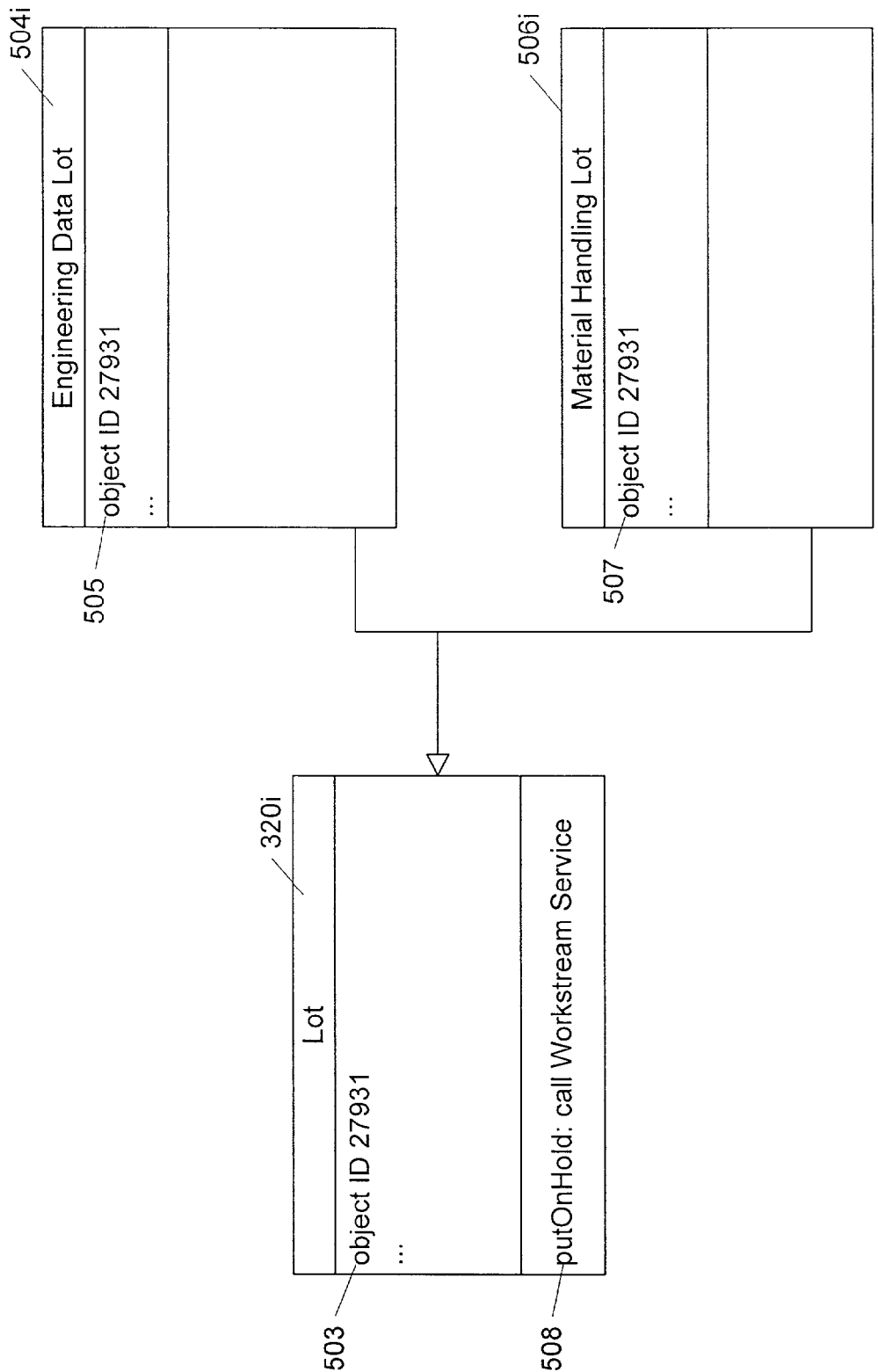
FIG. 5 shows a domain object superclass for a lot in a semiconductor manufacturing environment and subclasses of the lot superclass.

FIG. 5 illustrates a lot object 320i that is an instantiation of lot superclass 320 of FIG. 3. Engineering lot 504i is an instantiation of engineering data lot subclass 504 (not shown) and material handling lot 506i is an instantiation of material handling lot subclass 506 (not shown). These subclasses are implemented by two integrated applications, an engineering data domain application and a material handling domain application, and provide implementations of methods for lot superclass 502. Data fields objectID 503 and its corresponding value are inherited by each subclass, as shown by the value 27931 in both data fields objectID 505 of engineering data lot 504i and objectID 507 of material handling lot 506i.

The putOnHold method 508 for lot superclass 502 is implemented via a call to the WorkStream service (not shown), which provides an interface to the WorkStream legacy manufacturing execution system controlling the factory. Neither engineering data lot subclass 504 nor material handling lot subclass 506 provides an implementation of putOnHold method 508; instead, both subclasses inherit the putOnHold method 508 from parent lot superclass 502.

Figure 6:
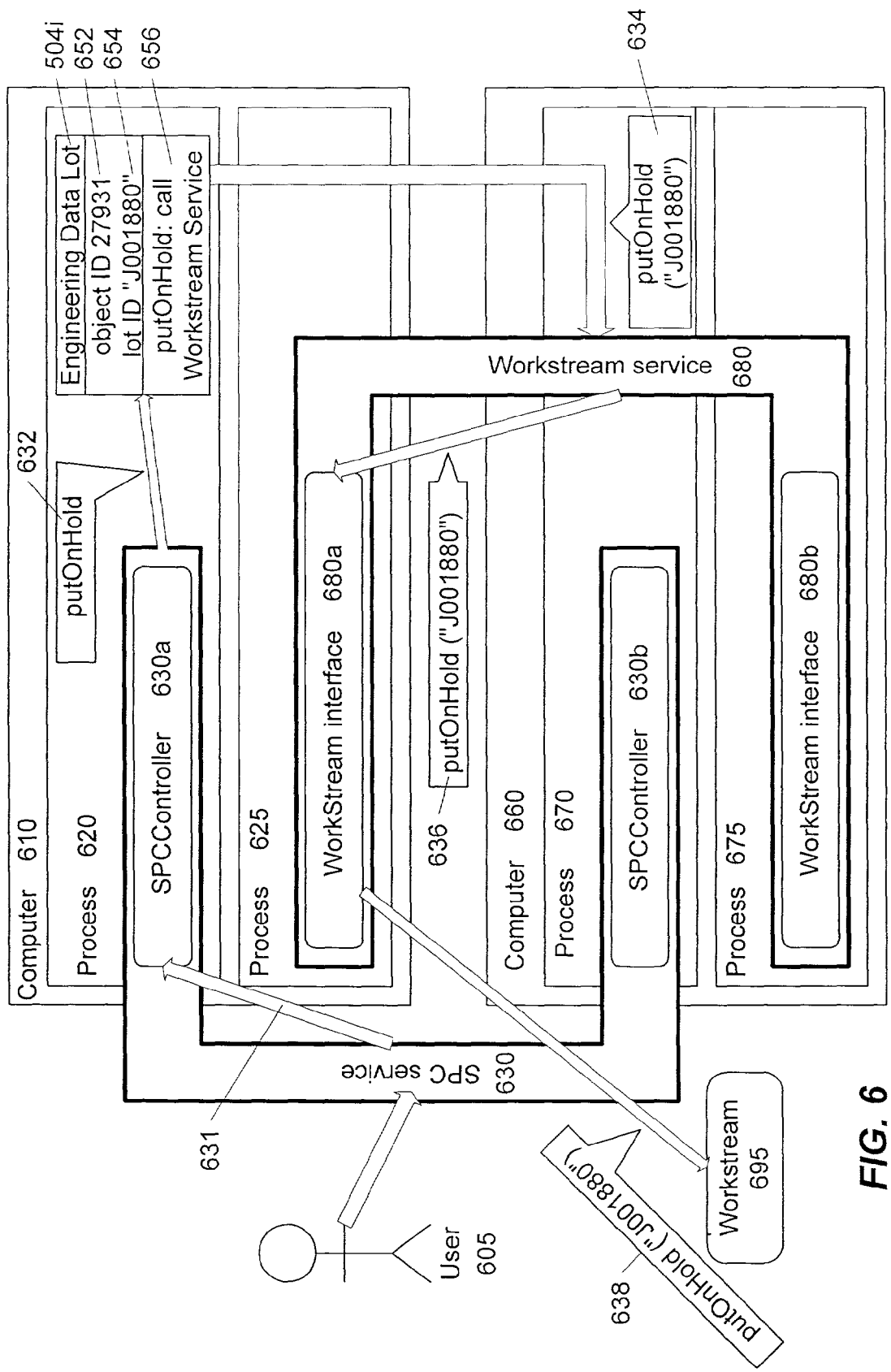
FIG. 6 shows an example of the operation of the putOnHold method for a lot using a legacy manufacturing execution system.

FIG. 6 shows an example of the operation of the putOnHold method 508 for a lot using the legacy manufacturing execution system WorkStream 695. User 605 can be a user of the factory system directly or a user of another domain application. In this example, user 605 requests the statistical processing control (SPC) service 630 to put the lot being processed, lot 504i, on hold. SPC service 630 has two controller components, SPCController component 630a running on computer 610 as process 620, and SPCController component 630b running on computer 660 as process 670. SPC service 630 selects SPCController component 630a to perform the putOnHold operation, as shown by arrow 631.

As a result of the request, SPCController component 630a sends message 632 to the engineering data domain application. Engineering data lot 504i has object ID 652 with a value of 27931 and lot ID 654 with a value of J001880. The engineering data domain application implements the operation in putOnHold method implementation 656 as a call to WorkStream service 680.

WorkStream service 680 has two components, WorkStream interface 680a running on computer 610 as process 625 and WorkStream Interface 680b running on computer 660 as process 675. WorkStream service 680 chooses WorkStream interface 680a to perform the putOnHold method as shown by message 636. WorkStream interface 680a sends message 638 to WorkStream 695, which controls the factory and puts the lot on hold. WorkStream 695 updates its own internal data structures to indicate that the status of the lot is that it is on hold.

Suppose that user 605 then wants to examine all lots that are currently on hold. User 605 would query the factory system, which calls WorkStream to obtain the current status for each lot. As part of determining this status, WorkStream accesses the data structure corresponding to lot 504$i$ having objectID 27931 and lotID J001880 to determine that this particular lot is on hold. Factory system 100 would report that the status of lot 320$i$ with objectID 27931 is on hold, as if the put on hold operation had been performed on the lot 320$i$ with objectID 27931 itself.

Returning to FIG. 2, system manager 130 is operated by a system administrator for the factory system. System manager 130 is used to configure physical hardware and software in the factory. Physical hardware and software are represented in the factory system as system objects.

The embodiment of a factory system architecture shown in FIG. 2 includes three classes for system objects, a bootstrap class 220, a layer class 230, and a container class 240. A layer is an abstraction of an item such as a host (computer system), a process, a thread, or a container. A layer object, typically a container, hosts one or more components.

System manager 130 configures the factory system using a bootstrap 220$i$, an instantiation of bootstrap class 220. Bootstrap 220$i$ configures a configuration layer as an instantiation of a layer subclass (not shown). Examples of layer subclasses include subclasses for hosts, processes, threads, and containers. Each configuration layer is responsible for configuring its children configuration layers. Ultimately a configuration layer runs one or more components 260$i$.

The present invention provides many advantages. The architecture overcomes the fact that domain applications are distributed and have inconsistent interfaces and incompatible technologies. The architecture decreases the complexity of integrating information obtained from a large number of different domain applications residing in different locations and provided by different vendors. The architecture allows a domain application to be easily modified or replaced without affecting other domain applications. Finally, the architecture provides a common nomenclature for items in a factory and a common interface between domain applications.

OTHER EMBODIMENTS

The present invention has been described in the context of software applications running on one or more computer systems. However, those skilled in the art will appreciate that the present invention is capable of being distributed as a program product in a variety of forms, and that the present invention applies equally regardless of the particular type of signal bearing media used to actually carry out the distribution. Examples of signal bearing media include: recordable media such as floppy disks and CD-ROM and transmission media such as digital and analog communication links, as well as media storage and distribution systems developed in the future.

Additionally, the foregoing detailed description has set forth various embodiments of the present invention via the use of block diagrams, flowcharts, and examples. It will be understood by those within the art that each block diagram component, flowchart step, and operation and/or element illustrated by the use of examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard integrated circuits, as a computer program running on a computer, as firmware, or as virtually any combination thereof. Designing the circuitry and/or writing the programming code for the software or firmware would be well within the skill of one of ordinary skill in the art in light of this disclosure.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are exemplary only, and are not exhaustive of the scope of the invention. Consequently, the invention is intended to be limited only by the spirit and scope of the appended claims, giving full cognizance to equivalents in all respects.

What is claimed is:

1. A system for integrating data between a plurality of software applications in a factory environment, the system and the plurality of software applications being stored on computer readable media, the system comprising comprising:

a factory system comprising:
        a domain object superclass;
        a plurality of first-level subclasses of the domain object superclass, an instantiation of one of the plurality of first-level subclasses corresponding to a domain object, the domain object representing an item in a factory; and
        a service, the service providing an operation related to the domain object, the service comprising at least one component, each of the at least one component being operable to perform the operation related to the domain object;
    and
    a domain application comprising:
        an implementation of one component of the at least one component of the service of the factory system to perform the operation related to the domain object.

2. The system of claim 1, wherein the domain application is one of a group consisting of the following:

a legacy system; and an integrated application.

3. The system of claim 1 wherein the domain application corresponds to an integrated application comprising:

a second-level subclass of one first-level subclass of the plurality of first-level subclasses of the domain object superclass of the factory system, an instantiation of the second-level subclass corresponding to an application-specific domain object;

and the implementation of the one component corresponds to a method of the application-specific domain object, wherein the method is operable to perform the operation on the application-specific domain object, wherein the performing the operation on the application-specific domain object enables the domain object to communicate as if the operation were performed on the domain object.

4. The system of claim 1 wherein
the domain application corresponds to a legacy system comprising:
a data structure corresponding to the domain object; and
the implementation of the one component corresponds to an interface to the legacy system, wherein the legacy system is operable to perform the operation on the data structure.

5. The system of claim 1, wherein
the operation comprises a plurality of operations.

6. The system of claim 1, wherein
the service comprises a plurality of services.

7. The system of claim 1, wherein
each component of the at least one component of the service has a corresponding domain application providing an implementation of the component.

8. The system of claim 1, wherein
the service includes instructions for selecting a component of the at least one component to perform the operation, the selecting providing a selected component; and
the selected component includes instructions to perform the operation.

9. The system of claim 1, wherein
a component of the at least one component is an interface to the domain application.

10. The system of claim 9, wherein
a requesting component of the at least one component includes instructions to use the interface to request the domain application to provide data to a receiving component of the at least one component; and
the receiving component includes instructions to receive the data from the domain application via the interface.

11. The system of claim 10 wherein
the receiving component and the requesting component are the same.

12. The system of claim 10 wherein
the receiving component further includes instructions to perform the operation on the domain object.

13. The system of claim 1 further comprising:
a system manager for managing hardware and software in the factory.

14. A factory system being stored on computer readable media for integrating data between a plurality of software applications in a factory environment, one of the plurality of software applications corresponding to a domain application, the factory system comprising:
a domain object superclass;
a plurality of first-level subclasses of the domain object superclass, an instantiation of one of the first-level subclasses of the plurality of first-level subclasses corresponding to a domain object, the domain object representing an item in a factory; and
a service, the service providing an operation related to the domain object, the service comprising at least one component, each of the at least one component being operable to perform the operation related to the domain object;
and wherein
the domain application includes:
an implementation of one component of the at least one component of the service of the factory system to perform the operation related to the domain object.

15. A domain application being stored on computer readable media for integrating data between a plurality of software applications in a factory environment, one of the plurality of software applications corresponding to a factory system, the factory system including: a domain object superclass; a plurality of first-level subclasses of the domain object superclass, an instantiation of one of the first-level subclasses corresponding to a domain object, the domain object representing an item in a factory; and a service, the service providing an operation related to the domain object using a component, the service comprising at least one component, each of the at least one component being operable to perform the operation related to the domain object; and a domain application comprising:
an implementation of one component of the at least one component of the service of the factory system, wherein the component is operable to perform the operation related to the domain object.

16. A method for integrating data between a plurality of software applications in a factory environment comprising:
providing a domain object superclass in a first software application, the first software application corresponding to a factory system;
providing a plurality of first-level subclasses of the domain object superclass;
instantiating one subclass of the plurality of first-level subclasses to create a domain object, the domain object representing an item in a factory;
providing a service that provides an operation related to the domain object, the service comprising at least one component, each of the at least one component being operable to perform the operation related to the domain object; and
performing the operation related to the domain object using an implementation of one component of the at least one component of the service, the implementation being provided by a second software application, the second software application corresponding to a domain application.

17. The method of claim 16 further comprising:
providing a second-level subclass of one first-level subclass of the plurality of first-level subclasses in the domain application, the domain application being an integrated application;
instantiating the second-level subclass to provide an application-specific domain object; implementing one component of the at least one component as a method of the application-specific domain object;
performing the operation related to the domain object on the application-specific domain object using the method;
and wherein
the performing the operation related to the domain object on the application-specific domain object enables the domain object to communicate as if the operation were performed on the domain object.

18. The method of claim 16 further comprising:
providing a data structure corresponding to the domain object in the domain application, the domain application being legacy system;
implementing one component of the at least one component to serve as an interface to the legacy system;
requesting the legacy system to perform the operation related to the domain object via the interface; and
performing the operation related to the domain object on the data structure.

19. The method of claim 16 further comprising:
requesting the service to perform the operation related to the domain object;
selecting a selected component of the at least one component to perform the operation related to the domain object; and
performing the operation related to the domain object using the selected component.

20. The method of claim 16 further comprising:
requesting the domain application to provide data to a receiving component of the at least one component; and
receiving the data from the domain application by the receiving component.

21. A computer program product for integrating data between a plurality of software applications in a factory environment comprising:
instructions for providing a domain object superclass in a first software application, the first software application corresponding to a factory system;
instructions for providing a plurality of first-level subclasses of the domain object superclass;
instructions for instantiating one subclass of the plurality of first-level subclasses to create a domain object, the domain object representing an item in a factory;
instructions for providing a service that provides an operation related to the domain object, the service comprising at least one component, each of the at least one component being operable to perform the operation related to the domain object; and
instructions for performing the operation related to the domain object using an implementation of one component of the at least one component of the service, the implementation being provided by a second software application, the second software application corresponding to a domain application;
and
a computer-readable medium for storing the instructions for providing the domain object superclass, the instructions for providing the plurality of first-level subclasses, the instructions for instantiating, the instructions for providing the service, and the instructions for performing the operation.

22. The computer program product of claim 21 further comprising:
instructions for providing a second-level subclass of one first-level subclass of the plurality of first-level subclasses in the domain application, the domain application being an integrated application;
instructions for instantiating the second-level subclass to provide an application-specific domain object;
instructions for implementing one component of the at least one component as a method of the application-specific domain object;
instructions for performing the operation related to the domain object on the application-specific domain object using the method, wherein the performing the operation enables the domain object to communicate as if the operation related to the domain object were performed on the domain object;
and wherein
the computer-readable medium further stores the instructions for providing the second-level subclass, the instructions for instantiating the second-level subclass; the instructions for implementing, and the instructions for performing the operation related to the domain object on the application-specific domain object.

23. The computer program product of claim 21 further comprising:
instructions for providing a data structure corresponding to the domain object in the domain application, the domain application being legacy system;
instructions for implementing one component of the at least one component to serve as an interface to the legacy system;
instructions for requesting the legacy system to perform the operation related to the domain object via the interface; and
instructions for performing the operation related to the domain object on the data structure;
and wherein
the computer-readable medium further stores the instructions for providing the data structure, the instructions for implementing the component to serve as the interface, the instructions for requesting, and the instructions for performing the operation related to the domain object on the data structure.

24. The computer program product of claim 21 further comprising:
instructions for requesting the service to perform the operation related to the domain object;
instructions for selecting a selected component of the at least one component to perform the operation related to the domain object; and
instructions for performing the operation related to the domain object using the selected component;
and wherein
the computer-readable medium further stores the instructions for requesting, the instructions for selecting a selected component, and the instructions for performing the operation related to the domain object using the selected component.

25. The computer program product of claim 21 further comprising:
instructions for requesting the domain application to provide data to a receiving component of the at least one component; and
instructions for receiving the data from the domain application by the receiving component;
and wherein
the computer-readable medium further stores the instructions for requesting and the instructions for receiving.

* * * * *